United States Patent
Ikeda

(10) Patent No.: US 9,179,068 B2
(45) Date of Patent: Nov. 3, 2015

(54) IMAGING APPARATUS, OPTICAL APPARATUS, IMAGING SYSTEM, AND CONTROL METHOD

(71) Applicant: CANON KABUSHIKI KAISHA, Tokyo (JP)

(72) Inventor: Shunichiro Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 13/916,136

(22) Filed: Jun. 12, 2013

(65) Prior Publication Data

US 2014/0002679 A1    Jan. 2, 2014

(30) Foreign Application Priority Data

Jun. 29, 2012    (JP) ................................. 2012-147357

(51) Int. Cl.
*H04N 5/228* (2006.01)
*H04N 5/232* (2006.01)

(52) U.S. Cl.
CPC ......... *H04N 5/23264* (2013.01); *H04N 5/2328* (2013.01); *H04N 5/23258* (2013.01); *H04N 5/23267* (2013.01)

(58) Field of Classification Search
CPC ................................................. H04N 5/23296
See application file for complete search history.

(56) References Cited

U.S. PATENT DOCUMENTS

| 2010/0149351 | A1* | 6/2010 | Tanaka ........................ 348/208.5 |
| 2011/0176015 | A1* | 7/2011 | Yun ........................... 348/208.11 |
| 2011/0273572 | A1* | 11/2011 | Tsuchida .................... 348/208.4 |
| 2012/0262590 | A1* | 10/2012 | Yumiki ....................... 348/208.5 |
| 2012/0293672 | A1* | 11/2012 | Nonaka et al. .............. 348/208.5 |
| 2012/0293674 | A1* | 11/2012 | Uenaka ...................... 348/208.99 |
| 2012/0321132 | A1* | 12/2012 | Ohta ............................. 382/103 |

FOREIGN PATENT DOCUMENTS

JP    2002-182260 A    6/2002
JP    2011-145604 A    7/2011

* cited by examiner

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An imaging apparatus includes an imaging unit configured to image an image within a first range on an imaging surface, a first correction unit configured to optically compensate for image shake on the image surface resulting from shake of a device, a second correction unit configured to electronically correct image shake on the image surface resulting from shake of the imaging apparatus, and output an image from a second range that is narrower than the first range, and a control unit configured to determine the moveable range of the first correction unit. The control unit performs control to increase the moveable range of the first correction unit when the second correction unit is used in comparison to when the second correction unit is not used.

10 Claims, 7 Drawing Sheets

IMAGING APPARATUS, OPTICAL APPARATUS, IMAGING SYSTEM, AND CONTROL METHOD

BACKGROUND

1. Technical Field

The present disclosure relates to an imaging apparatus, an optical apparatus, an imaging system and a control method.

2. Description of the Related Art

An imaging apparatus has been proposed that includes an image stabilization function configured to detect shake in the imaging apparatus, and drive a stabilization means (for example an imaging lens) to correct image shake resulting from the shake (hand shake). This image stabilization function is termed an optical image stabilization. Furthermore, an image stabilization function has been proposed in which shake in a captured image during moving image capturing is corrected by output of an excised portion of the captured image. This type of image stabilization function is termed electronic image stabilization.

Optical image stabilization and electronic image stabilization both enable stabilization of larger image shake resulting from hand shake as the range within which stabilization is enabled is increased. However, there is a limit to the range within which correction is enabled. When using optical image stabilization, there is a limit to the mechanical driving range for driving of the imaging lens used as the stabilization means. Furthermore, when using optical image stabilization, a configuration is required to prevent occurrence of shading in the captured image when driving the imaging lens. On the other hand, when using electronic image stabilization, although the periphery of a region that is excised as the output image from the captured image is used as a surplus pixel, as the number of surplus pixels increases, the angle of field of the output image is reduced in comparison to a configuration not using electronic image stabilization.

In this context, an imaging apparatus has been proposed that combines use of optical image stabilization and electronic image stabilization to thereby enlarge the range within which correction is enabled. For example, Japanese Patent Application Laid-Open No. 2002-182260 discloses an imaging apparatus that controls optical image stabilization and electronic image stabilization in response to electronic zoom. This imaging apparatus increases the correction due to electronic image stabilization when the magnification of the electronic zoom is large, and increases the correction due to optical image stabilization when the magnification of the electronic zoom is small. Furthermore, Japanese Patent Application Laid-Open No. 2011-145604 discloses an imaging apparatus that controls optical image stabilization and electronic image stabilization in response to the exposure time or the optical zoom magnification. This imaging apparatus sets the high correction ratio for optical image stabilization as the optical zoom magnification increases or the exposure time decreases.

However, the imaging apparatus disclosed in Japanese Patent Application Laid-Open No. 2002-182260 or in Japanese Patent Application Laid-Open No. 2011-145604 only varies the proportion of the electronic image stabilization and the optical image stabilization under specific conditions. That is to say, the imaging apparatus disclosed in Japanese Patent Application Laid-Open No. 2002-182260 or in Japanese Patent Application Laid-Open No. 2011-145604 both execute correction within a range within which correction is enabled which is individually determined in relation to electronic image stabilization or optical image stabilization, and therefore, the range within which correction is enabled cannot be enlarged.

SUMMARY

The imaging apparatus according to the present disclosure is an imaging apparatus that combines optical image stabilization (optical-type image stabilization) and electronic image stabilization (electronic-type image stabilization) to thereby enhance the effect of image stabilization by enlarging the moveable range of optical image stabilization.

The imaging apparatus according to the present embodiment includes an imaging unit configured to image an image within a first range on an imaging surface, a first correction unit configured to optically compensate for image shake on the imaging surface resulting from shake of the imaging apparatus, a second correction unit configured to electronically correct image shake on the image surface resulting from shake of the imaging apparatus, and output an image from a second range that is narrower than the first range, and a control unit configured to determine the moveable range of the first correction unit, wherein the control unit performs control to increase the moveable range of the first correction unit when the second correction unit is used in comparison to when the second correction unit is not used.

According to the present disclosure, in addition to an image stabilization effect due to electronic image stabilization (electronic-type image stabilization), the efficacy of image stabilization is further enhanced by enlarging the moveable range of optical image stabilization (optical-type image stabilization).

Further features of the disclosure will become apparent from the following description of exemplary embodiments (with reference to the attached drawings).

DESCRIPTION OF THE EMBODIMENTS

First Embodiment

Figure 1:
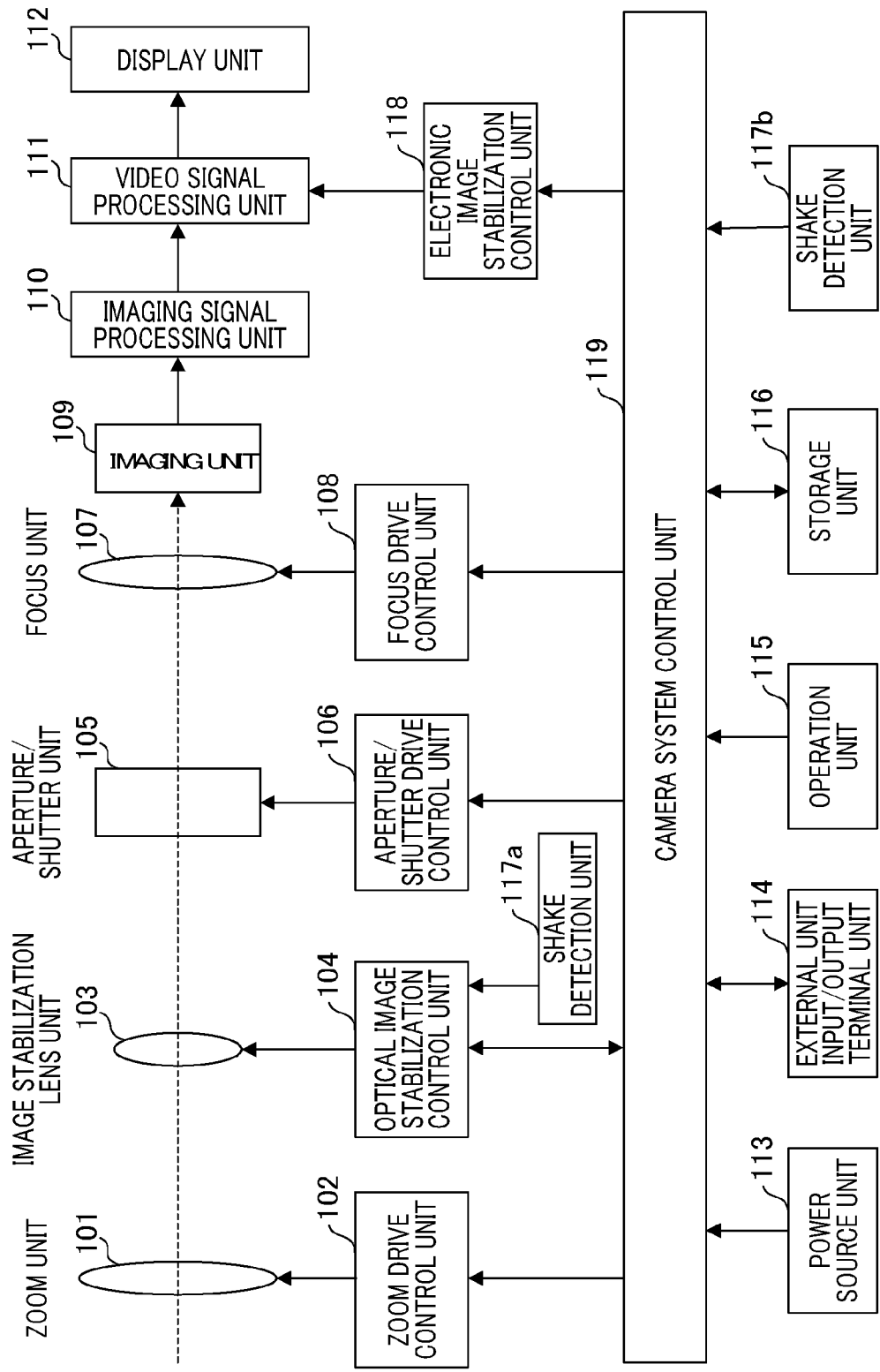
FIG. 1 illustrates a configuration of an imaging apparatus according to a first embodiment.

FIG. 1 illustrates a configuration of an imaging apparatus according to a first embodiment of the present disclosure. The imaging apparatus illustrated in FIG. 1 is a digital camera that mainly executes image capture of a moving image and a still image.

In FIG. 1, a zoom unit 101 includes a zoom lens for varying magnification. A zoom drive control unit 102 controls the driving of the zoom unit 101. The image stabilization lens unit 103 includes an image stabilization lens (shift lens) that enables variation of the position in a vertical plane relative to the optical axis. An optical image stabilization control unit 104 is a first correction unit configured to control the movement of the image stabilization lens unit 103 that is the correction member. The image stabilization lens unit 103 performs optical image stabilization to optically correct image shake due to hand shake detected by the shake direction unit 117a according to a driving amount that is controlled by the optical image stabilization control unit 104. That is to say, a camera system control unit 119 and the optical image stabilization control unit 104 function as a control unit that performs optical image stabilization to optically correct image shake due to hand shake detected by the shake detection unit 117a.

An aperture/shutter drive control unit 106 controls driving of a shutter unit 105. A focus unit 107 includes a focus lens for adjustment of the focus. A focus drive control unit 108 controls the driving of the focus unit 107.

An imaging unit 109 converts an optical image that has passed through the respective lens groups into an electronic signal. An image signal processing unit 110 converts the electronic signal outputted from the imaging unit 109 into an image signal. A video signal processing unit 111 processes the video signal outputted from the image signal processing unit 110 in response to a use. A display unit 112 displays an image as required based on the signal outputted from the video signal processing unit 111.

A power source unit 113 supplies power to the entire system in response to a use. An external unit input/output terminal unit 114 inputs/outputs a communication signal and video signal with an external unit. An operation unit 115 is an operation unit for operation of the system. A storage unit 116 stores various types of data such as video information. The shake detection units 117a, 117b detect shake (hand shake amount) of the imaging apparatus. The shake detection unit 117a detects shake in a pitch direction and yaw direction (direction about an axis that is orthogonal to the optical axis of the imaging optical system) in relation to the hand shake components. The shake detection unit 117b detects shake in a roll direction (direction about the optical axis of the imaging optical system) in relation to the hand shake components. An electronic image stabilization control unit 118 functions as a second correction unit that controls the video signal processing unit 111 based on the hand shake amount detected by the shake detection unit 117b and performs electronic image stabilization to electronically correct image shake resulting from hand shake in a roll direction. The camera system control unit 119 controls the overall system. The optical image stabilization control unit 104 and the electronic image stabilization control unit 118 may be configured as a portion of the camera system control unit 119 or may be an independent unit.

The operation unit 115 includes an image stabilization switch that enables selection of an image stabilization mode. When the image stabilization mode is selected by the image stabilization switch, the camera system control unit 119 commands the optical image stabilization control unit 104 and the electronic image stabilization control unit 118 to perform an image stabilization operation. After receive the command, the optical image stabilization control unit 104 and the electronic image stabilization control unit 118 perform an image stabilization operation until an OFF command of the image stabilization is received. The valid or invalid setting of the optical image stabilization and electronic image stabilization may be set individually.

The operation unit 115 includes an capturing mode selection switch that enables selection of one of a still image capturing mode and a moving image capturing mode. When the capturing mode is selected by the operation of the capturing mode selection switch, the operating conditions for the respective actuators for the zoom unit 101, the optical image stabilization control unit 104, the aperture/shutter unit 105, the focus unit 107 are varied in response to the selected capturing mode.

The operation unit 115 includes a shutter release button configured so that a first switch (SW1) and a second switch (SW2) are placed in order in the ON position in response to a pressing amount. When the shutter release button is pressed by approximately half a range, the switch SW1 is placed in the ON position, and when the shutter release button is pressed to a final position, the switch SW2 is placed in the ON position.

When the switch SW1 is in the ON position, the focus drive control unit 108 adjusts the focus by driving the focus unit 107, and the aperture/shutter drive control unit 106 drives the aperture/shutter 105 to thereby set a suitable exposure amount. When the switch SW2 is in the ON position, the image data obtained from the optical image exposed onto the imaging unit 109 is stored in the storage unit 116.

The operation unit 115 includes a moving image recording switch. When the switch is pressed, a moving image capturing is commenced, and recording is completed when the switch is pressed on a subsequent occasion during recording. A still image capturing is enabled by pressing the shutter release button during moving image capturing. Furthermore, the operation unit 115 includes a playing mode selection switch for selection of the playing mode. When a playing mode is selected by operation of the playing mode selection switch, the camera system control unit 119 stops image stabilization operations. At this time, the power supply to the actuator of the image stabilization lens unit 103 may be cut, or control may be performed to fix the unit to a predetermined position while maintaining power supply to the actuator.

The operation unit 115 includes a variable magnification switch that executes commands for varying zoom magnification. When a command for varying zoom magnification is input by the variable magnification switch, the zoom drive control unit 102 that receives the command through the camera system control unit 119 drives the zoom unit 101 to thereby move the zoom unit 101 to a zoom position corresponding to the command. The focus drive control unit 108 adjusts the focus by driving the focus unit 107 based on the image information processed by the respective signal processing units (110, 111) sent from the imaging unit 109. The control method according to the present embodiment is realized by the functions of the respective processing unit provided in the imaging apparatus illustrated in FIG. 1.

Figure 2:
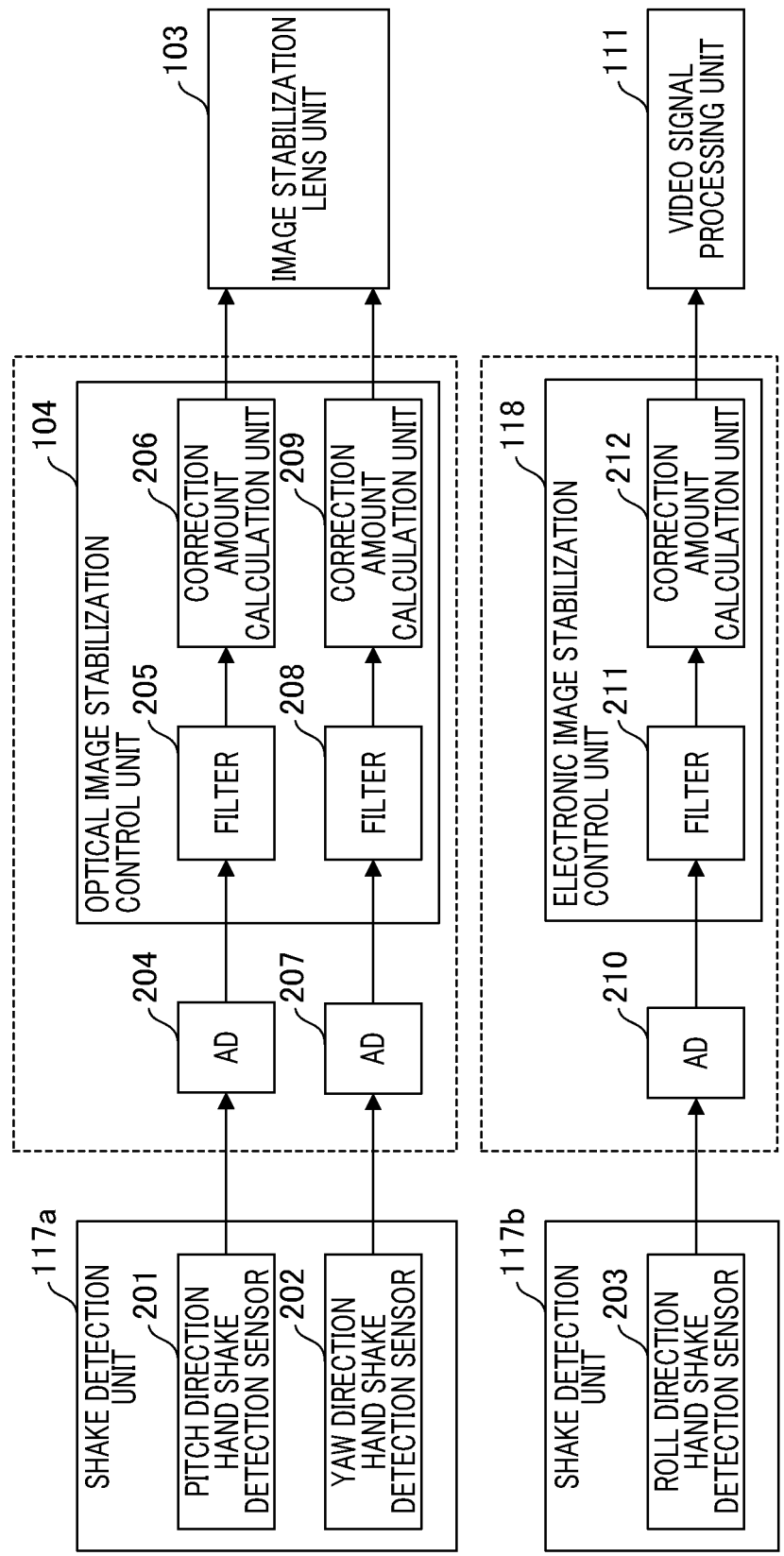
FIG. 2 illustrates an example of a configuration of an image stabilization control mechanism provided in the imaging apparatus.
Figure 7:
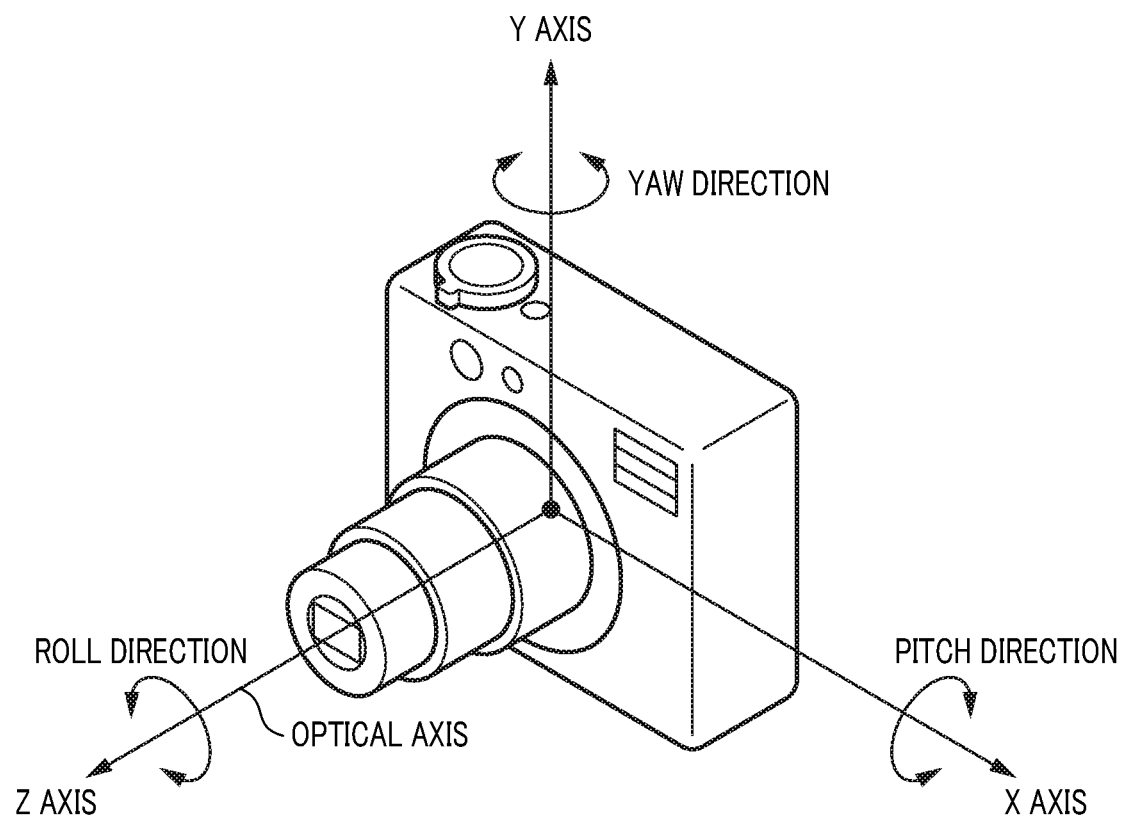
FIG. 7 illustrates a pitch direction, yaw direction, and roll direction.

FIG. 2 illustrates an example of the configuration of the image stabilization control mechanism provided in the imaging apparatus. The shake detection unit 117 detects angular velocity data mainly by use of a gyro sensor that is used as a hand shake detection sensor, and outputs the detection result as a voltage. The shake detection unit 117a includes a pitch direction hand shake detection sensor 201 and a yaw direction hand shake detection sensor 202. The shake detection unit 117b includes a roll direction hand shake detection sensor 203. In the present embodiment, as illustrated in FIG. 7, the optical axis is the Z axis, the perpendicular direction in a positive direction is the Y axis, and the direction that is orthogonal to the Y and Z axes is the X axis. Therefore, the pitch direction is the direction about the X axis (tilting direction), the yaw direction is the direction about the Y axis (panning direction), and the roll direction is the direction about the Z axis (the direction in which the imaging surface rotates in a plane that is vertical relative to the optical axis). That is to say, the pitch direction is the direction of inclination relative to the horizontal plane in the vertical direction of the imaging apparatus, and the yaw direction is the direction of inclination relative to the vertical plane in the horizontal direction of the imaging apparatus. These directions are mutually orthogonal.

The pitch direction hand shake detection sensor 201 detects shake information corresponding to shake of the imaging apparatus in the pitch direction. The yaw direction hand shake detection sensor 202 detects shake information (angular velocity data) corresponding to shake of the imaging apparatus in the yaw direction. The roll direction hand shake detection sensor 203 detects shake information (angular velocity data) corresponding to shake of the imaging apparatus in a rotation direction within a plane that is vertical to the optical axis.

The data output by the shake detection units 117*a, b* are converted to digital data through respective AD conversion units 204, 207, 210. The digital data corresponding to the output voltage of the pitch direction hand shake detection sensor 201 and the yaw direction hand shake detection sensor 202 are input to the optical image stabilization control unit 104. The digital data corresponding to the output voltage of the roll direction hand shake detection sensor 203 is input to the electronic image stabilization control unit 118.

The digital data corresponding to the output voltage of the pitch direction hand shake detection sensor 201 is input to a filter calculation unit 205 provided in the optical image stabilization control unit 104. The high-pass filter provided in the filter calculation unit 205 eliminates offset components in the shake detection sensor (gyro sensor) or temperature drift components. A low-pass filter provided in the filter calculation unit 205 integrates the angular velocity data without modification to thereby convert it to angular data and generates a shake amount. The shake amount is input to a correction amount calculation unit 206. The correction amount calculation unit 206 calculates a correction amount for driving control of the image stabilization lens unit 103 based on a parameter such as the position of the zoom lens.

The digital data corresponding to the output voltage of the yaw direction hand shake detection sensor 202 is input to a filter calculation unit 208. The high-pass filter provided in the filter calculation unit 208 eliminates offset components in the gyro sensor or temperature drift components. A low-pass filter provided in the filter calculation unit 208 integrates the shake information (angular velocity data) without modification to thereby convert it to angular data and generate a shake amount. The shake amount is input to a correction amount calculation unit 209. The correction amount calculation unit 209 calculates a correction amount for driving control of the image stabilization lens unit 103 based on a parameter such as the position of the zoom lens. That is to say, the image stabilization lens unit 103 corrects image shake in the pitch direction and the yaw direction.

The same processing operation as the processing performed by the optical image stabilization control unit 104 is also performed by the electronic image stabilization control unit 118. That is to say, digital data corresponding to the output voltage of the roll direction hand shake detection sensor 203 is input to a filter calculation unit 211. The filter calculation unit 211 generates a shake amount in a rotation direction. Then a correction amount calculation unit 212 calculates a correction amount for control of the video signal processing unit 111 based on the generated shake amount, that is to say, calculates a correction amount for correction of the image shake in the roll direction.

The optical image stabilization control unit 104 that includes the AD conversion units 204 and 207 is configured in the present embodiment by a CPU that is independent from the CPU that performs control of the imaging processing. This is due to the fact that it is necessary to execute periodically a high-speed image stabilization control such as filter calculation, sampling of the gyro sensor data, or the like. The function of the electronic image stabilization control unit 118 that includes an AD conversion unit 210 is realized by a CPU that performs the control of the imaging processing. The electronic image stabilization control is performed in synchrony with the control for imaging processing, and therefore, in case where electronic image stabilization control is performed using the CPU that performs optical image stabilization control, there is the possibility that the intended image stabilization control effect will not be obtained due to the processing delay resulting from communication time lag between the CPUs.

In this manner, when adopting a configuration in which optical image stabilization control and image processing control are controlled by respectively different CPUs, the electronic image stabilization control is performed by the CPU that performs imaging processing. The electronic image stabilization control may be performed by the CPU that is connected by a high-speed communication line (bus) with the CPU that performs imaging processing control.

Figure 3:
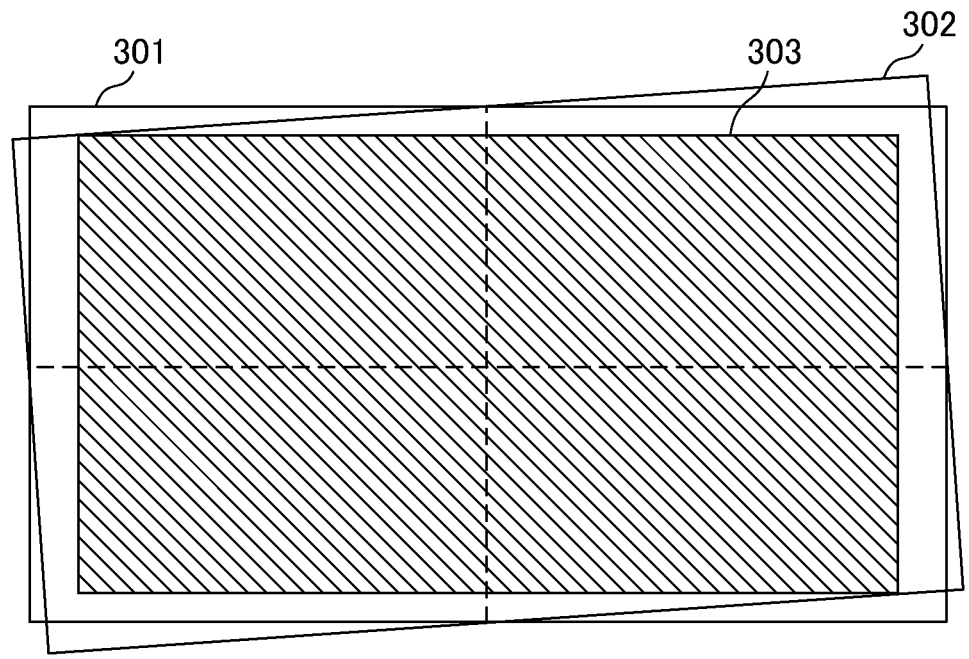
FIG. 3 illustrates the processing details of electronic image stabilization control.

FIG. 3 illustrates the processing details of electronic image stabilization control. Data from the roll direction hand shake detection sensor 203 is input to the electronic image stabilization control unit 118t. The electronic image stabilization control unit 118 calculates a correction amount so that the video signal processing unit 111 performs rotation correction in order to cancel out the shake in the rotation direction (deviation between image frames). The rotation image 302 that is subjected to rotation correction based on the correction amount corresponds to the captured image 301 input to the video signal processing unit 111. Furthermore, the electronic image stabilization control unit 118 performs an excision process on the rotation image 302 using an inscribed portion having the same aspect as the captured image 301 to thereby generate an output image 303. The performance of the excision process in relation to each frame of the moving image enables performance of electronic image stabilization control to thereby correct a deviation between image frames in the direction of rotation.

The electronic image stabilization control unit 118 determines the maximum range within which correction is enabled and performs an excision process on the output image 303 using a fixed ratio in relation to the captured image 301. This is to prevent variation in the field of view resulting from the hand shake amount. The region that is peripheral to the region that is excised as the output image 303 is configured as a surplus pixel. The electronic image stabilization control unit 118 constantly performs the excision process on the output image 303 without reference to a hand shake amount, and therefore the field of view is narrowed in comparison to the output field of view when control is not performed for electronic image stabilization.

Figure 4:
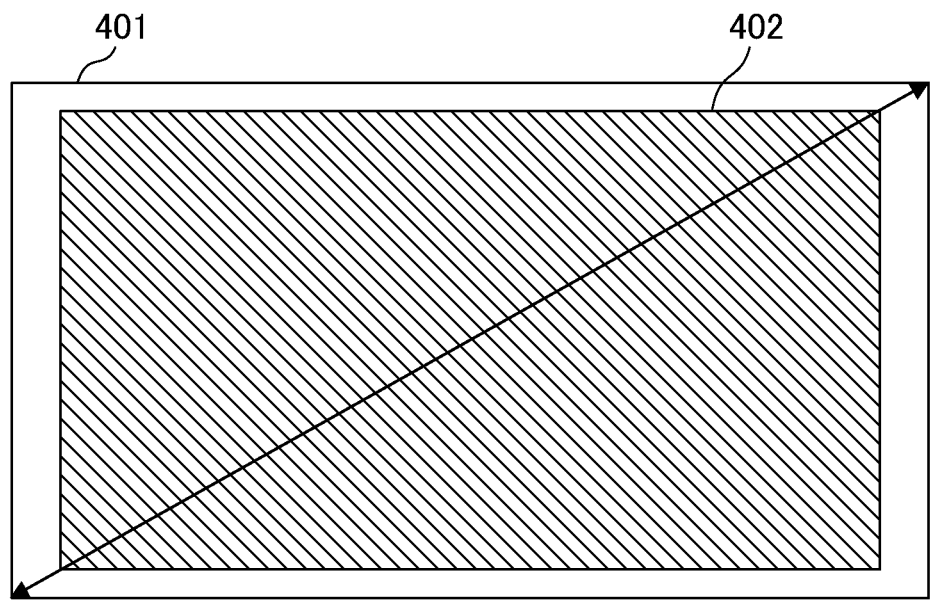
FIG. 4 illustrates an output angle of field corresponding to the validity or invalidity of the electronic image stabilization control.

FIG. 4 illustrates an output angle of field corresponding to the validity or invalidity of the electronic image stabilization control during moving image capturing. An angle of field 401 is an output angle of field (first range) in which the setting for electronic image stabilization control is invalid. An angle of field 402 is an output angle of field (second range) in which the setting for electronic image stabilization control is valid. The output angle of field during still image capturing is the same as the angle of field 401 when the setting for electronic image stabilization control is invalid. Although the angle of field is narrowed when the setting for electronic image stabilization control is valid, it is useful in relation to optical shading resulting from the imaging optical system such as light fall-off at edges since the angle of field is narrowed. In this regard, the imaging apparatus according to the present embodiment executes the following processing. The imaging apparatus enlarges the moveable range for optical image stabilization by driving of the image stabilization lens unit 103 to a region in which shading is not generated within that range when the angle of field is associated with a valid setting for electronic image stabilization control, rather than when the setting for electronic image stabilization control is invalid. That is to say, the camera system control unit 119 switches so that narrow angle of field is output and enlarges the moveable range for optical image stabilization when the setting for electronic image stabilization control is valid.

For example, when the variation amount of the output angle of field when the setting for electronic image stabilization control is valid is 10%, the 10% correspondence amount for the angle of field becomes the maximum enlargement amount of the moveable range that can be allocated for optical image stabilization. The camera system control unit 119 calculates the 10% correspondence amount for the corresponding angle of field that is determined by a speck on the optical lens as the maximum enlargement amount that can be allocated for optical image stabilization. The camera system control unit 119 determines the enlargement amount for the moveable range for optical image stabilization based on the calculated maximum allocation enlargement amount and the mechanical driving range for the image stabilization lens. That is to say, the camera system control unit 119 determines a variation amount between the output angle of field when the setting is invalid and the output angle of field obtained by electronic image stabilization when the setting for electronic image stabilization is valid. The camera system control unit 119 determines the drive amount for the image stabilization lens unit 103 that enlarges the moveable range for optical image stabilization based on the determined variation amount.

Figure 5:
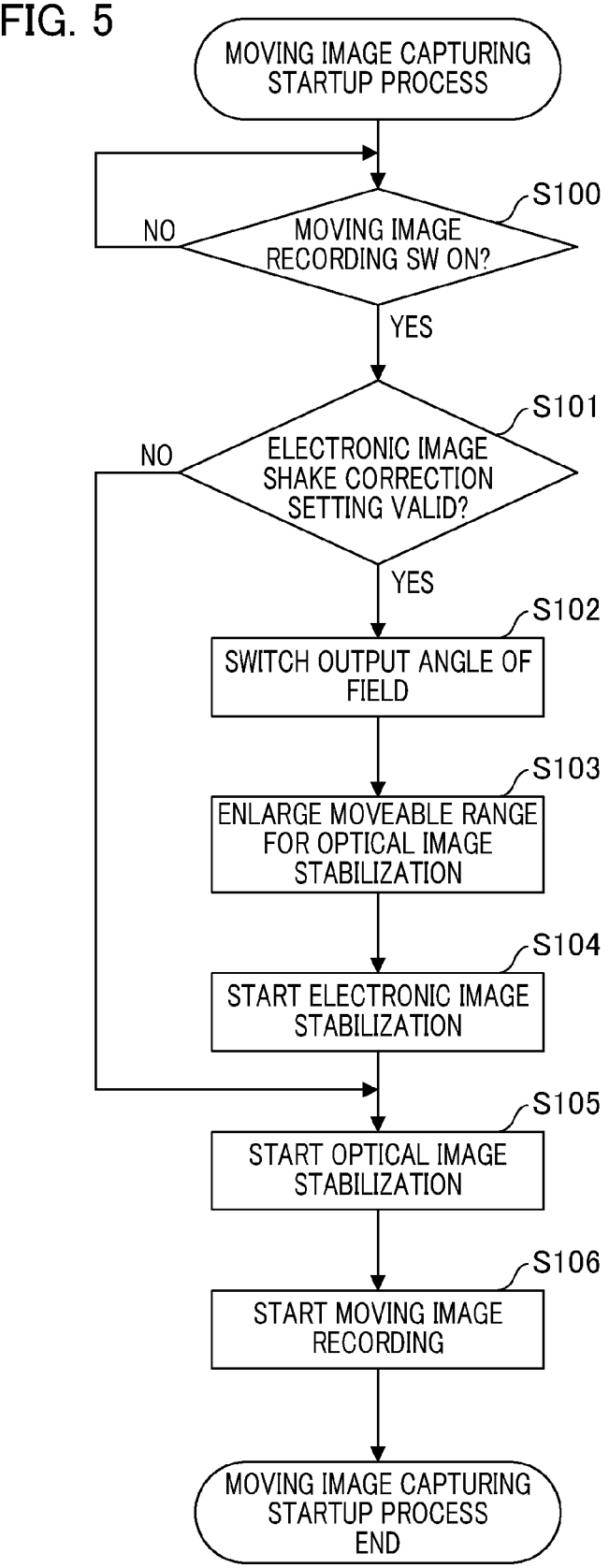
FIG. 5 is a flowchart illustrating an example of startup processing of movie capturing by the imaging apparatus according to the first embodiment.

FIG. 5 is a flowchart illustrating an example of startup processing of moving image capturing by the imaging apparatus according to the first embodiment. In the present embodiment, the setting for optical image stabilization is valid, and the camera system control unit 119 varies the processing operation in response to whether the setting for electronic image stabilization is valid or invalid.

Firstly, the camera system control unit 119 determines whether the moving image recording switch included in the operation unit 115 is in the ON position (step S100). When the moving image recording switch is not in the ON position, the processing returns to step S100. When the moving image recording switch is in the ON position, the processing proceeds to step S101.

Then, the camera system control unit 119 determines whether the setting for electronic image stabilization is valid (step S101). More specifically, the camera system control unit 119 determines whether the setting for electronic image stabilization is valid based on the details of the operation of the image stabilization switch included in the operation unit 115. When the setting for electronic image stabilization is invalid, the camera system control unit 119 proceeds the processing to step S105. When the setting for electronic image stabilization is valid, the camera system control unit 119 proceeds the processing to step S102.

In step S102, the camera system control unit 119 switches an output angle of field to an output angle of field when the setting for electronic image stabilization is valid by commanding the electronic image stabilization control unit 118 (step S102). In this manner, the output angle of field is narrowed in comparison to the output angle of field when the setting for electronic image stabilization is invalid. Then, the camera system control unit 119 enlarges the moveable range for optical image stabilization with reference to the variation amount for the output angle of field resulting from the switching process for the output angle of field in the step S102 (step S103).

Then the electronic image stabilization control unit 118 starts control for electronic image stabilization (step S104). The optical image stabilization control unit 104 starts control for optical image stabilization (step S105). Then the camera system control unit 119 starts moving image recording (step S106), and thereby completes the startup processing for a moving image capturing.

The imaging apparatus according to the first embodiment switches output angle of field to a narrow output angle of field when the setting for the electronic image stabilization is valid, and enlarges the moveable range for optical image stabilization. In this manner, in addition to an effect for image stabilization obtained from electronic image stabilization, a moving image capturing is enabled in which there is a high effect on image stabilization by enlargement of the moveable range of optical image stabilization.

Second Embodiment

Figure 6:
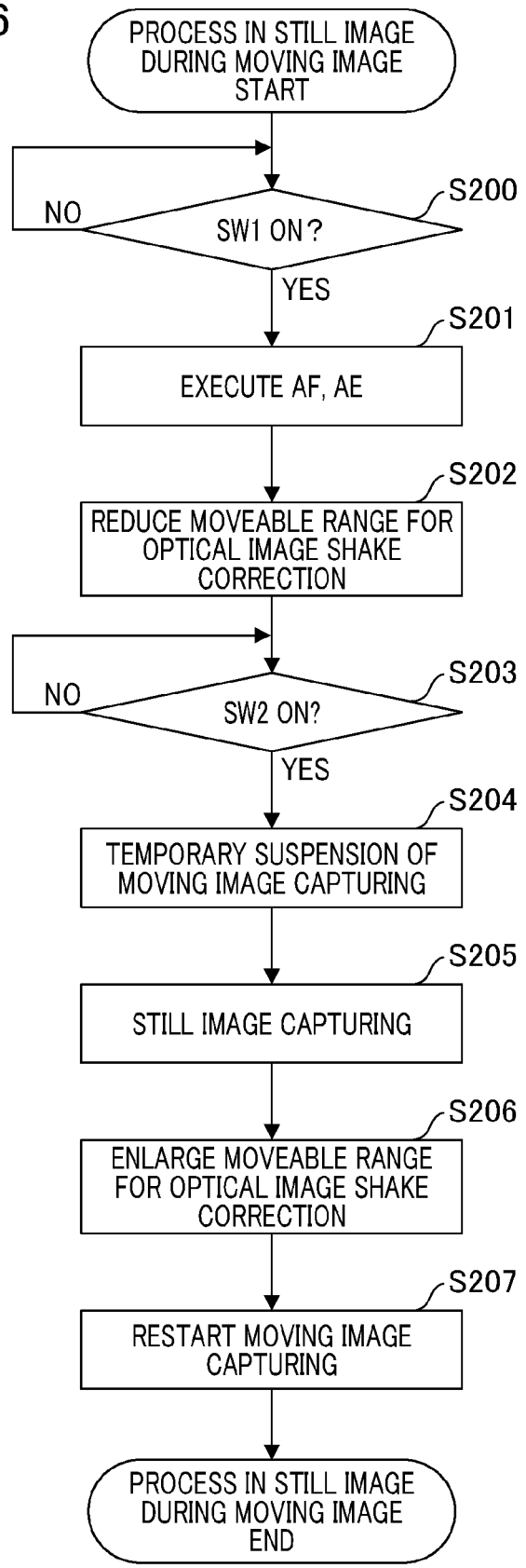
FIG. 6 is a flowchart illustrating an example of operating processing of the imaging apparatus according to a second embodiment.

FIG. 6 is a flowchart illustrating an example of operating processing of the imaging apparatus according to the second embodiment. The imaging apparatus according to the second embodiment returns a moveable range for optical image stabilization to its original range when still image capture is commanded, and in case where the moveable range for optical image stabilization has been enlarged and the setting for electronic image stabilization during moving image capture is valid. In operation startup processing as illustrated in FIG. 6, it is assumed that the moveable range for optical image stabilization is enlarged and the setting for electronic image stabilization during moving image capturing is valid.

Firstly, during moving image capture, the camera system control unit 119 determines whether there is a command for still image capture, that is to say, whether the switch SW1 included in the operation unit 115 is in the ON position (step S200). In other words, the camera system control unit 119 functions as a detection unit configured to detect whether a still image capturing has been commanded when the moveable range of optical image stabilization has been enlarged and the setting for the electronic image stabilization during moving image capture is valid. When the switch SW1 is not in the ON position, the processing returns to step S200, and when the switch SW1 is in the ON position, the processing proceeds to step S201.

Next, the focus drive control unit 108 executes a focus adjustment (AF) by driving the focus unit 107. Then the aperture shutter drive control unit 106 drives the aperture shutter 105 to executes suitable adjustment of the exposure amount (AE) (step S201).

Then, the camera system control unit 119 reduces the moveable range for optical image stabilization, that had been enlarged due to a valid setting for electronic image stabilization, to the moveable range for an invalid setting for electronic image stabilization (step S202). That is to say, the camera system control unit 119 varies the drive amount for the image stabilization lens unit 103 to the drive amount when the setting for electronic image stabilization is valid. The angle of field during still image capturing is the same as the angle of field 401 when the setting for electronic image stabilization is invalid and not the angle of field 402 when the setting for electronic image stabilization is valid. That is to say, the angle of field during still image capturing is wider than the current angle of field when the setting for electronic image stabilization is valid, and therefore there is a risk that shading will be caused in the captured image due to the shake amount of the apparatus during still image capturing. As a result, the camera system control unit 119 returns the moveable range of the optical image stabilization to the moveable range when the setting for electronic image stabilization is invalid, that is to say, to the original moveable range.

Next, the camera system control unit 119 determines whether the switch SW2 contained in the operation unit 115 is in the ON position (step S203). When the switch SW2 is not in the ON position, the processing returns to step S203, and when the switch SW2 is in the ON position, the processing proceeds to step S204.

Then the camera system control unit 119 temporarily suspends the moving image capture processing, and switches the processing to still image capture processing (step S204). The camera system control unit 119 stores the image data obtained from the optical image exposed on the imaging unit 109 in the storage unit 116, and thereby performs still image capture (step S205).

When still image capture is completed, the camera system control unit 119 again enlarges the moveable range for optical image stabilization from the operational range reduced in step S202 to the moveable range when the setting for electronic image stabilization is valid (step S206). Then the camera system control unit 119 restarts the moving image capture processing that had been temporarily suspended in step S204 (step S207), and completes the operational processing when capture of a still image is commanded during moving image capture. According to the imaging apparatus in the second embodiment, occurrence of shading in a captured image can be prevented when capture of a still image is commanded during moving image capturing.

Although it has been described with reference to FIG. 6 that the switch SW2 is placed in the ON position after the switch SW1 in the operation unit 115 is placed in the ON position, the same operational processing may be performed when the switch SW1 is released (placed in the OFF position) after the switch SW1 is placed in the ON position.

The fact that the switch SW1 is in the OFF position after being in the ON position means that the command to image a still image detected in S200 has been released. In this case, the camera system control unit 119 varies the drive amount of the image stabilization lens unit 103 from the drive amount when the setting for the electronic image stabilization is invalid to a drive amount in which the moveable range of the optical image stabilization is enlarged. That is to say, in the modified example according to the second embodiment, the imaging apparatus executes the following processing when the switch SW1 is placed in the OFF position after being in the ON position. The imaging apparatus firstly reduces the moveable range for the optical image stabilization to a moveable range when the setting for the electronic image stabilization is invalid, and then again enlarges the range to the moveable range when the setting for the electronic image stabilization is valid. In this manner, when the command to capture a still image is released, it is possible to recommence moving image capturing with a high image stabilization effect.

In the operation process described making reference to FIG. 6, it is necessary to prevent interruption of viewing the moving image as a result of a temporary suspension of the process of moving image capturing when still image capture during moving image capturing is performed. Therefore, the camera system control unit 119 may embed the still image that is captured during moving image capturing into the moving image. When the still image that is captured during moving image capturing is embedded into the moving image (hereinafter referred to as "still image capturing during moving image capturing"), the angle of field 402 when the setting for the electronic image stabilization is valid is different from the angle of field 401 in still image capturing (when the setting for the electronic image stabilization is invalid). Therefore, when the still image capturing during moving image capturing is embedded into the moving image in that state, a viewer may experience a feeling of strangeness due to the occurrence of a change in the angle of field before and after embedding of the still image capturing during moving image capturing. In this respect, when the camera system control unit 119 embeds the still image capturing during moving image capturing into the moving image when the setting for the electronic image stabilization is valid, the embedding is performed by reducing the captured still image in moving image to coincide with the angle of field when the setting for the electronic image stabilization is valid.

Figure 8:
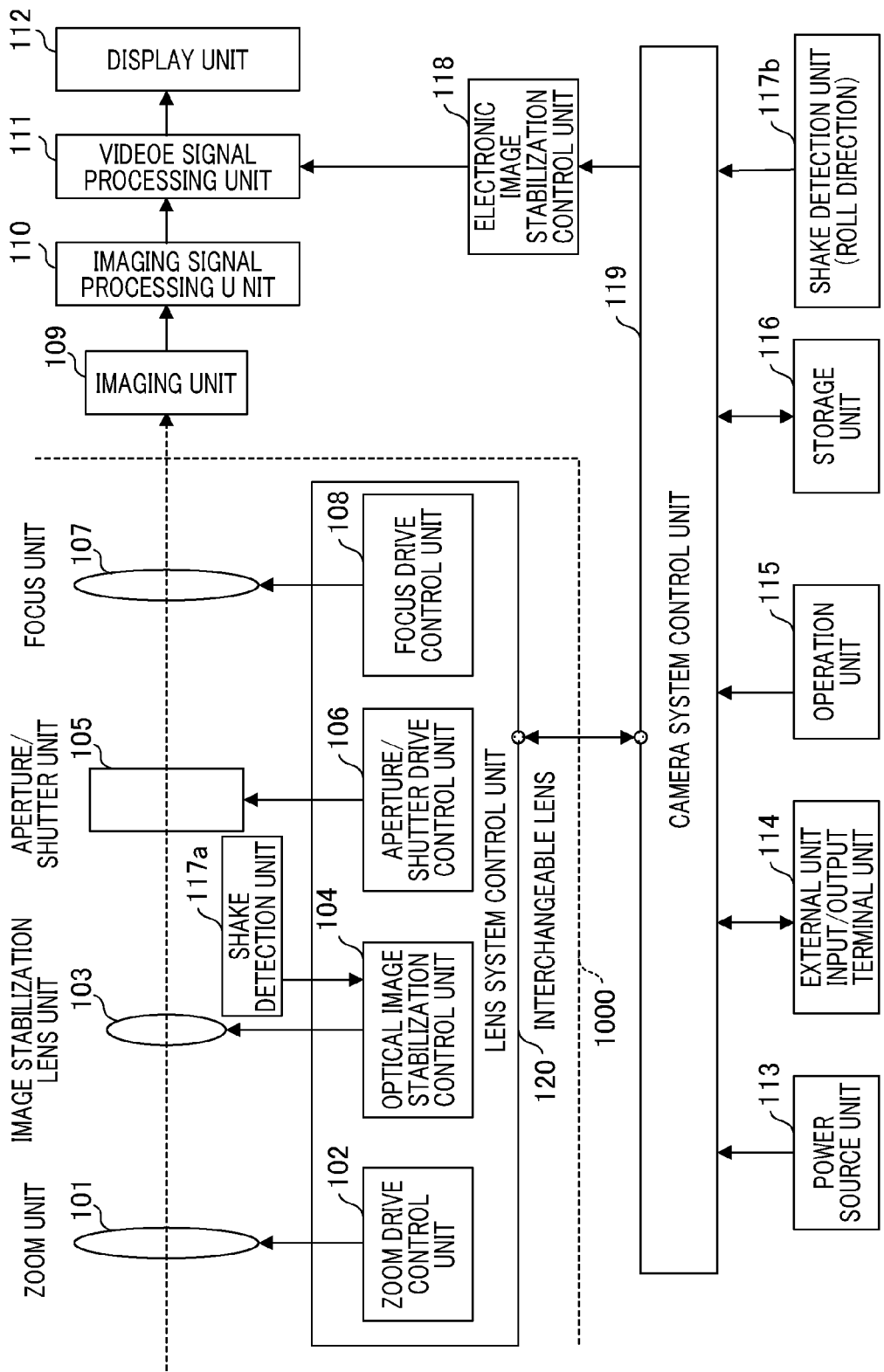
FIG. 8 is a block diagram illustrating the configuration of an imaging apparatus according to a modified example.

In the modified example in the first and second embodiments, a configuration of an interchangeable-lens imaging apparatus is possible. FIG. 8 is a block diagram of this configuration. FIG. 8 illustrates blocks 101 to 108 in FIG. 1 on the interchangeable lens 1000 side which is an optical apparatus, and blocks 109 to 119 on the imaging apparatus main body side. However, during a manual zoom operation, the zoom control unit 102 does not drive the zoom, and the shutter 105 is on the main body side (not shown). An imaging system can be realized that modifies the moveable range of the image stabilization lens on the interchangeable lens side in response to the setting of the electronic image stabilization operated by the operation unit 115 on the main body side as a result of communication between the main body and the lens.

When the setting for the electronic image stabilization is valid in S101 in FIG. 5, the details are communicated to the interchangeable lens 1000 side. The lens system control unit 120 on the lens side controls the operation in S102 and S103. Furthermore, in FIG. 6, the fact that the switch SW1 is pressed between S200 to S202, and the fact that the SW2 is pressed at a timing between S203 to S206 is communicated to the interchangeable lens 1000 side.

In this manner, a interchangeable-lens imaging apparatus can switch output angle of field to a narrow output angle of field when the setting for the electronic image stabilization is valid, and enlarge the moveable range of the optical image stabilization provided in the interchangeable lens. In this manner, in addition to the effect of the image stabilization obtained by the electronic image stabilization, moving image capturing with a high image stabilization is enabled by enlarging the moveable range of the optical image stabilization. Furthermore, when there is a command to capture a still image in case where the setting for the electronic image stabilization during moving image capturing is valid and the moveable range of the optical image stabilization is enlarged, the moveable range for the optical image stabilization provided in the interchangeable lens is returned to its original moveable range. Therefore, it is possible to prevent the occurrence of shading in a captured image when there is a command to capture a still image capturing during moving image capturing.

Although the preferred embodiments of the present disclosure have been described above, the present disclosure is not limited to these embodiments and various modifications and changes are possible within a scope that does not depart from the spirit of the disclosure.

Aspects of the present disclosure can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present disclosure has been described with reference to exemplary embodiments, it is to be understood that the claimed invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-147357 filed Jun. 29, 2012, which is hereby incorporated by reference herein in its entirety.

What is claimed is:

1. An imaging apparatus comprising:
   an imaging unit configured to capture an image within a first range on an imaging surface;
   a first correction unit configured to optically correct for image shake on the image surface resulting from shake of the imaging apparatus;
   a second correction unit configured to electronically correct image shake on the image surface resulting from shake of the imaging apparatus, and output an image from a second range that is narrower than the first range; and
   a control unit configured to determine a moveable amount of the first correction unit,
   wherein the control unit performs control to increase the moveable amount of the first correction unit when second correction unit is performed in comparison to when the second correction unit is not performed.

2. The imaging apparatus according to claim 1, wherein the control unit determines an increasing amount for the moveable amount of the first correction unit based on a variation amount between an output angle of field obtained by image stabilization by the second correction unit when a setting for image stabilization by the second correction unit is valid, and the output angle of field when the setting for image stabilization by the second correction unit is invalid.

3. The imaging apparatus according to claim 1, wherein the first correction unit corrects image shake in a pitch direction and yaw direction, and the second correction unit corrects image shake in a roll direction.

4. The imaging apparatus according to claim 1, wherein the control unit increases the moveable amount of the first correction unit to an amount in which shading is not occurred within the range of the output angle of field when the setting for image stabilization by the second correction unit is valid.

5. The imaging apparatus according to claim 1 further comprising a detection unit configured to detect, during moving image capturing, whether there is a command for still image capturing when the moveable amount of the first correction unit is increased and the setting for the image stabilization by the second correction unit is valid, and
   wherein, when the detection unit detects that there is the command for the still image capturing, the control unit varies the moveable amount of the first correction unit to a moveable amount when the setting for the image stabilization by the second correction unit is invalid.

6. The imaging apparatus according to claim 5, wherein the detection unit further detects whether the detected command for the still image capturing is released, and
   Wherein, when the detection unit detects that the detected command for the still image capturing is released, the control unit varies the moveable amount of the first correction unit from the moveable amount when the setting for the image stabilization by the second correction unit is invalid to an increasing amount for the moveable amount of the first correction unit.

7. An optical apparatus that is mounted on an imaging apparatus provided with a correction unit configured to electronically correct image shake resulting from shake of the apparatus, the optical apparatus comprising:
   an image stabilization unit configured to optically correct image shake on an image surface resulting from shake of the apparatus;
   a receiving unit configured to receive, from the imaging apparatus, information indicating whether the correction unit provided in the imaging apparatus is performed; and
   a control unit configured to determine a moveable amount of the image stabilization unit,
   wherein the control unit performs control to increase the moveable amount of the image stabilization unit when the information indicates that the correction unit is performed in comparison to when the information indicates that the correction unit is not performed.

8. An imaging system comprising:
   an optical apparatus comprising:
   an image stabilization unit configured to optically correct for image shake on an image surface resulting from shake of the apparatus; and
   a control unit configured to determine a moveable amount of the image stabilization unit; and
   an imaging apparatus comprising:
   an imaging unit configured to capture an image within a first range on the imaging surface;
   a correction unit configured to electronically correct image shake on the image surface resulting from shake of the apparatus, and output an image from a second range that is narrower than the first range, and
   wherein the control unit performs control to increase the moveable amount of the image stabilization unit when the correction unit is performed in comparison to when the correction unit is not performed.

9. A method for controlling an imaging apparatus, the method comprising:
   capturing an image within a first range on an imaging surface;
   optically correcting, by a first correction unit, for image shake on the image surface resulting from shake of the imaging apparatus;
   electronically correcting, by a second correction unit, image shake on the image surface resulting from shake of the imaging apparatus, and outputting an image from a second range that is narrower than the first range; and
   determining a moveable amount of the first correction unit, wherein, in the determining step, control is performed to increase the moveable amount of the first correction unit when the second correction unit is performed in comparison to when the second correction unit is not performed.

10. A method for controlling an optical apparatus that is mounted on an imaging apparatus provided with a correction unit configured to electronically correct image shake resulting from shake of the apparatus, the method comprising:
optically correcting, by an image stabilization unit, image shake on an image surface resulting from shake of the apparatus;
receiving, from the imaging apparatus, information indicating whether the correction unit provided in the imaging apparatus is performed; and
determining a moveable amount of the image stabilization unit,
wherein, in the determining step, control is performed to increase the moveable amount of the image stabilization unit when the information indicates that the correction unit is performed in comparison to when the information indicates that the correction unit is not performed.

* * * * *